(12) United States Patent
Harrop

(10) Patent No.: US 7,203,746 B1
(45) Date of Patent: Apr. 10, 2007

(54) SYSTEM AND METHOD FOR ADAPTIVE RESOURCE MANAGEMENT

(75) Inventor: Thomas C. Harrop, Folsom, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 606 days.

(21) Appl. No.: 09/734,273

(22) Filed: Dec. 11, 2000

(51) Int. Cl.
*G06F 15/173* (2006.01)

(52) U.S. Cl. .................. 709/224; 714/37; 714/47

(58) Field of Classification Search ............ 702/186; 709/226, 224; 715/734; 714/4, 46, 47, 39, 714/37; 710/8; 399/8
See application file for complete search history.

(56) References Cited

U.S. PATENT DOCUMENTS

| | | | |
|---|---|---|---|
| 5,615,323 A | 3/1997 | Engel et al. | |
| 5,887,216 A * | 3/1999 | Motoyama | 399/8 |
| 5,983,369 A * | 11/1999 | Bakoglu et al. | 714/46 |
| 5,999,179 A * | 12/1999 | Kekic et al. | 715/734 |
| 6,154,787 A * | 11/2000 | Urevig et al. | 710/8 |
| 6,167,538 A * | 12/2000 | Neufeld et al. | 714/47 |
| 6,405,327 B1 * | 6/2002 | Sipple et al. | 714/39 |
| 6,446,123 B1 * | 9/2002 | Ballantine et al. | 709/224 |
| 6,460,082 B1 * | 10/2002 | Lumelsky et al. | 709/226 |
| 6,470,464 B2 * | 10/2002 | Bertram et al. | 714/37 |
| 6,513,129 B1 * | 1/2003 | Tentij et al. | 714/4 |
| 6,516,350 B1 * | 2/2003 | Lumelsky et al. | 709/226 |
| 6,557,035 B1 * | 4/2003 | McKnight | 709/224 |
| 6,691,067 B1 * | 2/2004 | Ding et al. | 702/186 |
| 6,738,811 B1 * | 5/2004 | Liang | 709/224 |
| 6,782,350 B1 * | 8/2004 | Burnley et al. | 702/186 |
| 6,816,905 B1 * | 11/2004 | Sheets et al. | 709/226 |
| 6,892,317 B1 * | 5/2005 | Sampath et al. | 714/4 |
| 2003/0237016 A1 * | 12/2003 | Johnson et al. | 714/4 |

OTHER PUBLICATIONS

U.S. Appl. No. 09/469,025, Tentij et al., filed Dec. 21, 1999.*
U.S. Appl. No. 09/469,028, Tentij et al., filed Dec. 21, 1999.*
U.S. Appl. No. 09/702,160, Harrop, filed Oct. 30, 2000.*
U.S. Appl. No. 09/345,634, Tentij et al., filed Dec. 2001.

\* cited by examiner

*Primary Examiner*—John Follansbee
*Assistant Examiner*—Dustin Nguyen

(57) ABSTRACT

A system and method for monitoring resource requirements in a computer system and for adding (or subtracting) such resources as required. In a preferred embodiment, the system automatically, without user intervention, makes the resource adjustment when calculations indicate a need for such an adjustment. The system stores historical and statistical data concerning a multitude of parameters and the action taken with respect to the resources reflects a comparison against such stored data.

31 Claims, 2 Drawing Sheets

FIG. 5    $\Delta t = (x+y)/z$    501

WHERE $x$ = CURRENT INFORMATION
WHERE $y$ = NEW INFORMATION
WHERE $z$ = NUMBERING OF SAMPLING POINTS

SYSTEM AND METHOD FOR ADAPTIVE RESOURCE MANAGEMENT

RELATED APPLICATIONS

This application is related to co-pending application entitled "SYSTEM AND METHOD FOR POLICY-BASED NETWORK MANAGEMENT," assigned Ser. No. 09/469,025, filed Dec. 21, 1999; co-pending application entitled "SYSTEM AND METHOD FOR A COMMON OBJECT CLASS LIBRARY," assigned Ser. No. 09/469,026 filed Dec. 21, 1999; application entitled FAULT MANAGEMENT SYSTEM AND METHOD," Ser. No. 09/345,634, filed Jun. 30, 1999, now U.S. Pat. No. 6,513,129, issued on Jan. 28, 2003; and co-pending application entitled "METHOD AND SYSTEM FOR PREDICTIVE RESOURCE MANAGEMENT," assigned Ser. No. 09/702,160, filed Oct. 30, 2000, all of which are assigned to a common assignee, the disclosures of which are hereby incorporated herein by reference.

TECHNICAL FIELD

This invention relates to a system and method for adaptive resource management and more particularly to such systems and methods which allow for the monitoring of selected resources and for comparing the monitored resource against known and/or anticipated current/future usage criteria.

BACKGROUND

Typically, a company has a computer system with a certain amount of resources allocated for use by the system. Those resources could, for example, be e-commerce such as Internet, wireless, and the like. As time passes, applications are added to the system and eventually the system requires additional resources. When this happens, a user must manually add more resources to the system.

In this context, resources could be memory, CPUs, disk storage, network capacity, in fact, anything that makes the system more reliable or more robust. Thus, as time passes, the memory is required to hold more and more data, or the CPU must go faster, or a link for a network (such as the Internet) must be larger in capacity or faster in speed.

Currently, in order to add resources, a user must identify the problem and then identify the required resource(s). Then the user would have to turn the machine off, insert more resources into the system and restart the machine. This, of course, requires a certain amount of down time, a high technical skill level and the actual resource(s).

The problem is that most users do not understand when a new resource is necessary, so the upgrade is made only when it becomes an issue and only when it is determined that the problem will be solved by adding more resources to the system. The problem is even more difficult when the trouble comes from a resource that is only needed once in awhile, such as once a day, once a month, or once a year. When the resource is added it then is always available even if the demand time has passed (i.e., a demand for such resource no longer exists) or the demand for such resource is sporadic. For resources that are costly, this is a problem.

SUMMARY OF THE INVENTION

The present invention is directed to a system and method which is designed to monitor selected active resources on the system, including the CPU, memory, networking, and/or the input/output ("IO") resources of the system. The system also monitors the processes (applications) that are running on the system to see what the utilization of the resources are at any given time so as to anticipate future use levels. This can be done, if desired, on a user by user basis.

The system then stores the monitored data so that it can generate statistics which are gathered, as examples, every minute, every day, or every week or as otherwise desired. Thus, the system and the users can know what has happened for any period desired. The system is designed to use the gathered data to determine (or predict) what resources are (or will be) necessary and allow additional resources to be added by that application when needed. If the resource is no longer required, it can then return it to a pool of resources. The resource pool can be global (i.e. shared over the Internet), or can be enterprise wide which effectively allows for segmenting the system when needed.

Using this system and method, a user need not over plan (buy more resources than are needed up front), thereby conquering resources. The system and method operates, if desired, without user intervention and uses the monitored data to anticipate a problem, thereby eliminating unforseen problems. The proactive nature of the system reduces the amount of down time, which increases system reliability over time as opposed to spikes and periods where it is going to be down.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 5 shows an example of one statistical analysis for one embodiment of the invention.

DETAILED DESCRIPTION

Figure 1:
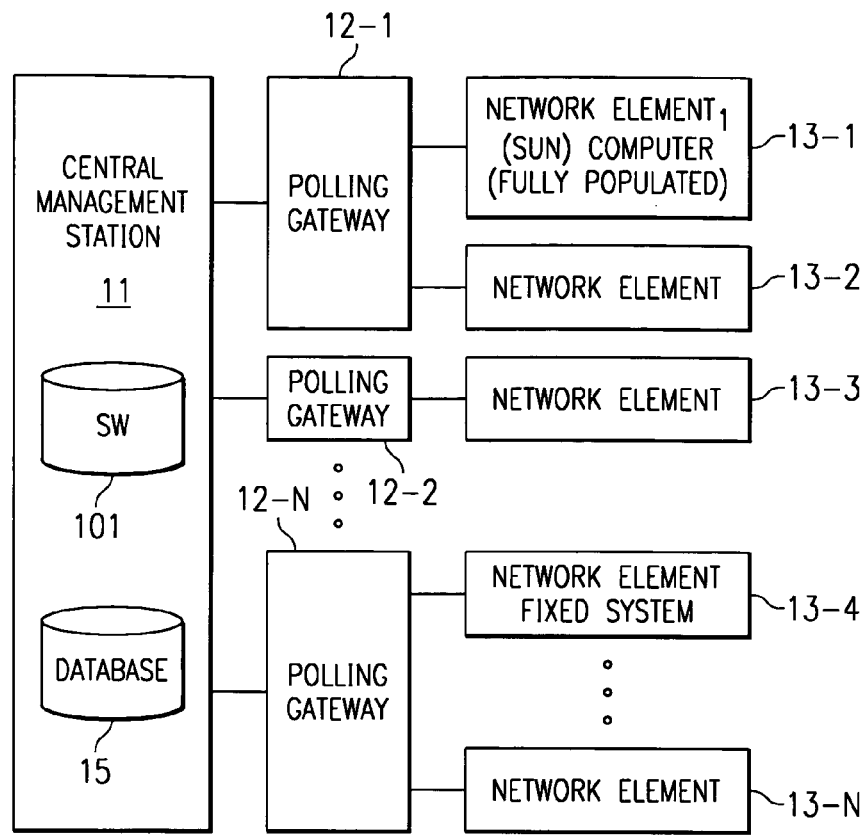
FIG. 1 shows a preferred embodiment of a central management station operating in conjunction with a number of network elements.

FIG. 1 shows central management station 11, including software package 101, which talks to generic gateways (GW) 12-1, 12-2, . . . 12-N, (referred to collectively as gateway(s) 12) which, in turn, communicate with network elements (NE) 13-1, 13-N, one or all of which may be, for example, a Sun system Model E10000, which can be fully populated with resources. The NE could be a fixed system, such as NE 13-4 with a fixed amount of resources or a system that allows for the permanent, or temporary, addition of resources via the Internet such as NE 13-1. Different NE's can be arranged in different formats, as desired.

Central management station 11 determines, via software program (SW) 101, what particular interval is desired and what parameters and elements are to be maintained, and instructs polling gateway(s) 12 (e.g. polling gateway 12-1) to poll specific networks elements. These network elements can be fixed system elements (such as NE 13-4) or an element (such as NE 13-1) with potentially unlimited resources. The polled elements would communicate back to the gateway the information that is requested.

Memory disk space, CPU, system 10, network bandwidth utilization, number of processes, and number of users are all examples of information that can be communicated back to gateway(s) 12. Gateway(s) 12 receives the information as requested from a particular network element and process the specific pieces of information that are required. As an example using memory utilization, the system could return average storage bits numbers, low balances, as well as swapping information. Not all of the information available from the CPU is necessary or desired so only the specific requested numerical information is obtained. Once that information is parsed out, it is sent to central management station 101 which performs a statistical analysis (as will be discussed), or any other desired type of analysis, on the returned information. The analysis, as well as the raw data, if desired, is stored. Based on that information, an analysis is performed which predicts a time to fail based on resource utilization, and, if desired, allocates additional memory, if such is available. For example, assuming more memory is required and using resource NE 13-1, the system is requested to allocate an additional Mbyte of memory. When the memory has been added, the proper charge is made to the user for the memory. Under some situations the system might only require the memory for a certain period of time and this would be factored into the cost. Also, the system could decide that less memory (or other resource) is needed and "give back" some resources. In this manner, such unneeded resource may be returned to the overall "pool" of resources.

Perhaps memory overload was temporary and is determined to exist for 72 hours with the system returning to "normal" thereafter. Under this situation, the system could go onto the Internet (or otherwise access a remote enterprise facility) and negotiate for storage capacity of a certain number N Mbytes for 72 hours.

In the case of a fixed system, the system would alert the user when it is determined that it is going to run out of resources. The system could prompt the user to take some specific action, and it can predict that if that action is not taken by a particular time or date, a certain list of "bad" things will happen. Thus, the system not only notifies the user that it is running out of resources or that the system is already out of resources, but it predicts that the system is on course to run out of resources at a particular time in the future.

The system can be set so that any addition of resources is controlled by the user or the resource addition can be automatically accomplished. In the situation where resources are automatically added (or subtracted/released), central management station 11 instructs gateway 12-1, for example, to communicate to network element device 13-1 and issue the specific commands to allocate the resource(s) necessary. Gateway 12-1 may be instructed in a similar manner to communicate to network element device 13-2 and issue the specific commands to allocate the resource(s) necessary.

Figure 2:
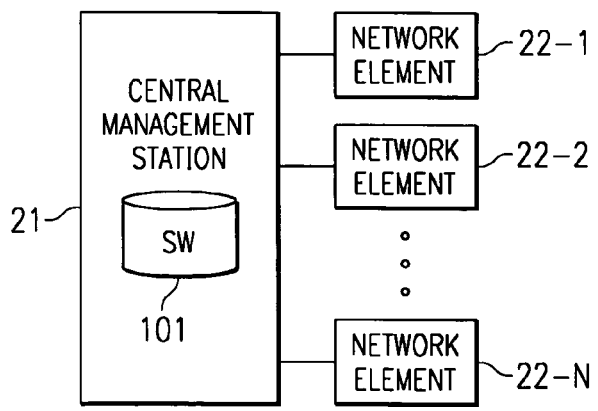
FIG. 2 shows a prior art central management system.

FIG. 2 shows a prior art central management station 21 in communication with network elements 22-1, 22-2, . . . to 22-N. As shown, distributed gateways are not utilized for processing, e.g., for instructing the network elements to allocate necessary resources(s). In such systems, gateways may be implemented for performing some type of processing, but such prior art systems do not include gateways capable of managing the network elements by instructing such elements to add more resources when needed.

As shown in FIG. 2, central management station 21 (for example, IBM and Tivoli units) could monitor the network elements but are not proactive. These prior art systems could only report on the current utilization of each element and do not give an estimate as to when those elements would run out of particular resources. Such systems cannot allocate additional resources even if such additional resources were available to those particular elements. Thus, the network administrator would have to continuously monitor the system and on his/her own calculate the various resource allocation and then decide what is the appropriate action to take (e.g., when to allocate additional resources, and how much additional resources to allocate). This is management by reaction and usually results in down time. In some cases the operator is proactive in actually making sure he/she is aware of the system by knowing what is happening and determining when to add or remove resources. However, such reliance on the operator manually taking such action is undesirable.

Figure 3:
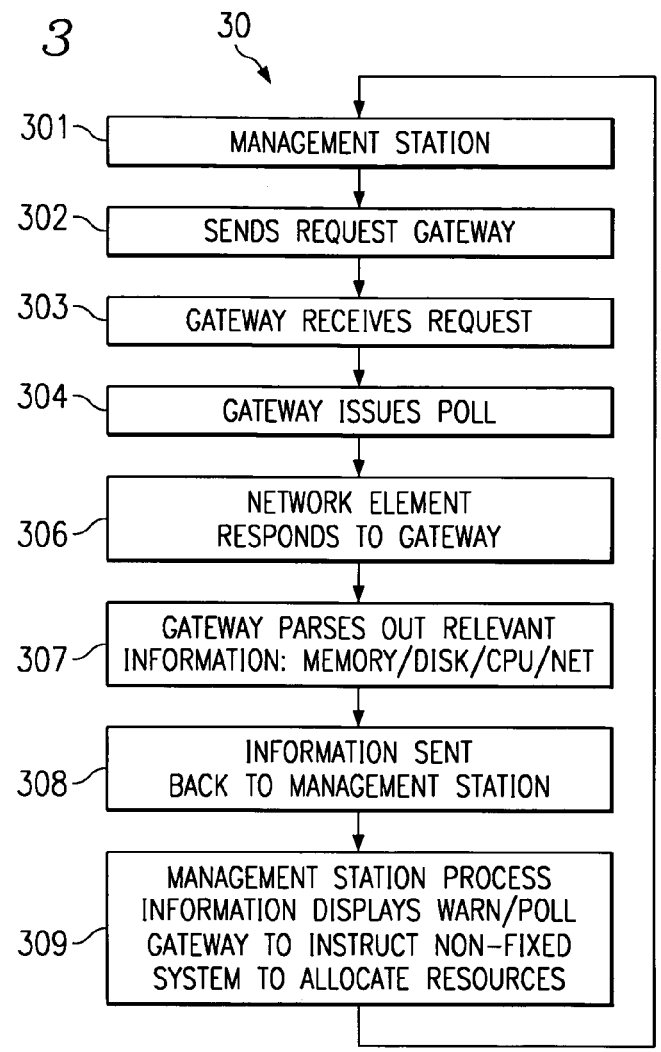
FIG. 3 shows a preferred embodiment of a process using the principle of this invention.
Figure 4:
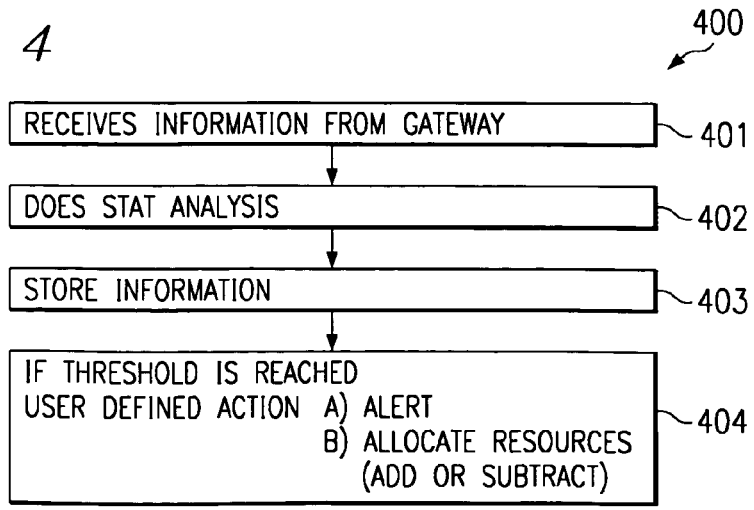
FIG. 4 shows an example of a process for utilizing the gathered information to change the resource level.

Turning now to FIG. 3, an exemplary flow diagram of an operational process 30 that may be implemented according to a preferred embodiment of the present invention is shown. As shown, process 30 starts in operational block 301 with a management system which sends a request in block 302 to a gateway. The gateway receives the request at block 303 and, in turn, requests information from a network element at block 304. There is a bidirectional communication between the gateway and the selected network element, wherein the network element responds to the gateway at block 306. The gateway then parses out the relevant information to the relevant resource, as shown in operational block 307. For example, again assume that a memory unit is being evaluated. The information pertaining to the memory is sent back through the gateway to management station 11 (FIG. 1) via operational block 308. The management system then processes the relevant information, storing some of that information in the run-time management information data base 15 (FIG. 1). As shown in FIG. 4 and based on the information that has been obtained by process 400, management station 11 may either display a warning to the user, or may autonomously attempt to allocate additional resources, block 404, to the actual network element via block of 309 of FIG. 3. As shown in FIG. 4, when central management station 11 ("CMS") receives the information, operational block 401, it will do one or more of preestablished analyses, block 402, which could include, for example, a statistical analysis, a count, a comparison of needed memory (or other resource)

to available memory (or other resource), processing speed, delay times, latencies, etc. That type of statistical analysis may be user defined. For example, a user interface (e.g., a graphical user interface) may be presented by the CMS to a user to enable the user to define (e.g., by using rules, which may include logical operands) the type(s) of statistical analysis to be performed. In the present example, the statistical analysis will take a moving average of the particular item that is being monitored from the network element and stores the results, as shown in block 403.

For instance, in a preferred embodiment, the system network administrator has an interface to the CMS, preferably visually using a GUI, which allows the network administrator to select or define statistical equations or whatever parameters are desired to be monitored. The administrator can choose from moving average, regression methods or whatever different types of specific method he/she wants to choose from, depending upon the resource(s) being monitored and depending upon the desired result. Additionally, these analyses can be changed under automatic control or can be changed based on system triggers (e.g., based on certain triggering events occurring), for example.

When the analysis is complete, as shown in block 404, the results will be stored in data base 15 (FIG. 1). After the information is stored, the system determines if a critical threshold has been reached. If the threshold has been reached in a fixed system, an alert to the operator will be generated stating that limits for specified resources are about to be reached. Preferably, the system can specify how much time remains until failures will be encountered. In a non-fixed system, the system preferably attempts to allocate additional resources to allow the processes to continue without intervention. Most preferably, the system autonomously determines whether resources are available that can be allocated and at what cost and, if desired, the user is notified. Of course, any level of user interaction desired may be implemented, from obtaining prior approval from a user for a resource allocation to simply notifying the user once a resource allocation has been completed.

FIG. 5 shows one example of a specific user-defined statistical analysis 501 that could be implemented for a moving average, as discussed above. The gathered data would be calculated and the result would be stored as, in this example, ΔT. The user would define threshold for ΔT that would cause a trigger as an indication that a threshold had been reached. This can be done in any of a number of ways, for example, by well-known comparison techniques against values stored in memory.

Thus, a user could set several limits, such that for example, when ΔT reaches 80 then the system takes a certain action, and if ΔT reaches 90, the system takes a certain other action. In a most preferred embodiment, a user may define both the triggers and the actions to be taken by the system upon the occurrence of each trigger. Of course, different limits and different rules (using a rules-based engine if desired) could be set for particular network elements that are being monitored. Thus, for example, one network element may be managed in one fashion, while another network element may be managed differently (e.g., according to different user-defined rules for resource allocation).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of automatically allocating additional hardware resources to a computer having a plurality of hardware resources, said method comprising:
 monitoring use of selected ones of the plurality of hardware resources by the computer to obtain historical utilization data pertaining to the historical availability to the computer of each monitored hardware resource;
 establishing a statistical analysis technique specific to each monitored hardware resource;
 automatically analyzing, according to the statistical analysis technique, the historical utilization data for each monitored hardware resource to arrive at a prediction of a future level of availability of each monitored hardware resource;
 providing a first signal when the prediction of the future level of availability of each monitored hardware resource fails to meet an availability threshold;
 automatically executing a new statistical analysis technique based on a second signal; and
 without user intervention, responding to the first signal by automatically reserving or ordering an additional physical hardware resource that is not in the computer when the first signal is provided and which is to be later manually physically added to the computer after the reserving or placing of an order.

2. The method of claim 1 further comprising the step of:
 performing at least one calculation with respect to certain of the obtained historical usage data.

3. The method of claim 1 wherein said step of responding to the first signal by automatically reserving or ordering occurs when the prediction indicates that the resources are below the availability threshold.

4. The method of claim 1 further comprising the step of:
 without user intervention, enabling the deallocation of the monitored hardware resources when the prediction indicates that the monitored hardware resources will not be required.

5. The method of claim 1 wherein the first signal is in graphical form for each of the monitored hardware resources.

6. The method of claim 1 wherein said step of analyzing comprises the step of:
 analyzing available applications with respect to the utilization by the available applications of the monitored hardware resources.

7. The method of claim 1 wherein the monitored hardware resources are selected from the set of resources, including memory, CPU, Disk, available ports, and network resources.

8. A method of adjusting hardware resources in a computer having a plurality of the hardware resources, said method comprising:
 monitoring use of selected ones of the plurality of hardware resources by the computer to obtain historical utilization data pertaining to the historical availability to the computer of each monitored hardware resource;

establishing a statistical analysis technique specific to each monitored hardware resource;

automatically analyzing, according to the statistical analysis technique, the historical utilization data to provide a prediction of a future level of availability of each monitored hardware resource;

automatically executing a new statistical analysis technique; and without user intervention, enabling an adjustment in resources when the prediction of the future level of availability of the monitored resource fails to meet an availability threshold.

9. The method of claim 8 further comprising the step of:
performing at least one calculation with respect to certain of the obtained historical utilization data.

10. The method of claim 8 wherein said step of enabling comprises the step of:
adding the hardware resources to the computer from a remote location.

11. The method of claim 8 wherein said step of enabling comprises the step of:
removing the hardware resources from the computer.

12. The method of claim 8 wherein said step of monitoring comprises the step of:
storing historical utilization data on resource utilization.

13. The method of claim 8 wherein said step of monitoring comprises the step of:
analyzing available applications with respect to utilization by the available applications of the monitored hardware resources.

14. A system for allocating additional hardware resources in a computer having a plurality of hardware resources said system comprising:

a monitoring unit monitoring use of selected ones of said plurality of hardware resources by the computer to obtain historical utilization data pertaining to the historical availability to the computer of each said selected one of said monitored hardware resource;

an analyzing unit automatically analyzing said obtained historical data to arrive at a prediction of a future level of availability of the monitored hardware resource, said analyzing unit capable of performing the analysis based on a statistical technique specific to each said selected one of said hardware resources;

a signal providing unit providing a first signal when said prediction of the future level of availability of the monitored resource fails to meet an availability threshold; and without user intervention, means for responding to said first signal by automatically allocating an additional hardware resource to be manually physically added to the computer, wherein said analyzing unit is capable of automatically executing a new statistical analysis technique based on a second signal.

15. The system of claim 14 further comprising:
means for performing at least one calculation with respect to certain of said obtained historical utilization data.

16. The system of claim 14 further comprising:
a unit operable without user intervention capable of enabling the reduction of said monitored hardware resources under control of said first signal when said prediction indicates that the monitored hardware resources are not required.

17. The system of claim 14 further comprising:
means for storing historical utilization data on resource utilization.

18. The system of claim 14 wherein said first signal is in graphical form for each of said monitored hardware resources.

19. The system of claim 14 further comprising:
means for analyzing all available applications with respect to the utilization by the available applications of the monitored hardware resources.

20. The system of claim 14 wherein said monitored hardware resources are selected from a group consisting of memory, CPU, Network, Disk, available ports, and network resources.

21. A system of allocating additional hardware resources in a computer having a plurality of hardware resources, said system comprising:

means for monitoring use of selected ones of said plurality of hardware resources by the computer to obtain historical utilization data pertaining to the historical availability to the computer of each said monitored hardware resource;

means for establishing a statistical analysis technique specific to each monitored hardware resource;

means for automatically analyzing, according to the statistical analysis technique, said obtained historical utilization data to arrive at a prediction of a future level of availability of said monitored hardware resource;

means for automatically executing a new statistical analysis technique; and without user intervention, means for enabling an adjustment in said monitored hardware resources when said prediction of the future level of availability of said monitored hardware resource fails to meet an availability threshold.

22. The system of claim 21 further comprising:
means for performing at least one calculation with respect to certain of said obtained historical utilization data.

23. The system of claim 21 wherein said means for enabling comprises:
means for adding resources to the computer from a remote location.

24. The system of claim 21 wherein said means for enabling comprises:
means for removing resources from the computer.

25. The system of claim 21 wherein said means for monitoring comprises:
means for storing historical utilization data on resource utilization.

26. The system of claim 21 wherein said means for monitoring comprises:
means for analyzing all available applications with respect to utilization by the available applications of the monitored hardware resources.

27. A computer program product operational in conjunction with a processor for allocating additional hardware resources in a computer having a plurality of hardware resources, said product comprising:

a monitor monitoring use of selected ones of said plurality of hardware resources by the computer to obtain historical utilization data pertaining to the historical availability to the computer of each said selected one of said monitored hardware resource;

an analyzer automatically analyzing said obtained historical data to arrive at a prediction of a future level of availability of the monitored hardware resource, said analyzer capable of performing the analysis based on a statistical analysis technique specific to each said selected one of said hardware resources, said analyzer capable of automatically executing a new statistical analysis technique; and an adjusting unit operable without user intervention capable of automatically allocating for manual physical addition, resources according to the analyzing.

28. The computer product of claim 27 further including:
a unit operable in cooperation with said analyzer performing at least one calculation with respect to certain of said obtained historical utilization data.

29. The computer product of claim 27 wherein said adjusting unit comprises:

means for adding resources to the computer from a remote location.

30. The computer product of claim 27 wherein said adjusting unit comprises:

means for removing resources from the computer.

31. The computer product of claim 27 wherein said analyzer is capable of storing historical utilization data on resource usage.

\* \* \* \* \*

UNITED STATES PATENT AND TRADEMARK OFFICE
CERTIFICATE OF CORRECTION

| | |
|---|---|
| PATENT NO. | : 7,203,746 B1 |
| APPLICATION NO. | : 09/734273 |
| DATED | : April 10, 2007 |
| INVENTOR(S) | : Harrop |

It is certified that error appears in the above-identified patent and that said Letters Patent is hereby corrected as shown below:

On the Title page, item (56), under "Other Publications", in column 2, line 2, delete "09/469,028" and insert -- 09/469,026 --, therefor.

On the Title page, item (56), under "Other Publications", in column 2, line 4, delete "Dec. 2001" and insert -- Jan. 2001 --, therefor.

Signed and Sealed this

Seventh Day of August, 2007

JON W. DUDAS
*Director of the United States Patent and Trademark Office*